US011869340B2

(12) United States Patent
Melman et al.

(10) Patent No.: US 11,869,340 B2

(45) Date of Patent: Jan. 9, 2024

(54) SYSTEM AND METHOD FOR DISTRIBUTED SECURITY

(71) Applicants: David Melman, Tel Aviv (IL); Shmuel Melman, Tel Aviv (IL)

(72) Inventors: David Melman, Tel Aviv (IL); Shmuel Melman, Tel Aviv (IL); Ilya Kharamatsky, Modiin (IL); Alex Kogan, Bat Yam (IL)

(*) Notice: Subject to any disclaimer, the term of this patent is extended or adjusted under 35 U.S.C. 154(b) by 1023 days.

(21) Appl. No.: 16/467,045

(22) PCT Filed: Dec. 9, 2017

(86) PCT No.: PCT/IL2017/051330

§ 371 (c)(1),
(2) Date: Jun. 6, 2019

(87) PCT Pub. No.: WO2018/104949

PCT Pub. Date: Jun. 14, 2018

(65) Prior Publication Data

US 2019/0318612 A1 Oct. 17, 2019

Related U.S. Application Data

(60) Provisional application No. 62/431,829, filed on Dec. 9, 2016.

(51) Int. Cl.

| | |
|---|---|
| ***G08B 29/18*** | (2006.01) |
| ***G08B 29/14*** | (2006.01) |
| ***G08B 25/00*** | (2006.01) |

(52) U.S. Cl.

CPC ......... *G08B 29/185* (2013.01); *G08B 25/001* (2013.01); *G08B 29/14* (2013.01)

(58) Field of Classification Search

CPC .............................. G08B 29/185; G08B 29/14

See application file for complete search history.

(56) References Cited

U.S. PATENT DOCUMENTS

| | | | | |
|---|---|---|---|---|
| 6,563,910 | B2 * | 5/2003 | Menard | H04L 63/0428 379/90.01 |
| 6,661,340 | B1 | 9/2003 | Saylor | |
| 9,013,294 | B1 | 4/2015 | Trundle | |
| 2014/0201072 | A1 | 7/2014 | Reeser | |
| 2015/0032366 | A1 * | 1/2015 | Man | H04W 4/024 701/414 |

* cited by examiner

*Primary Examiner* — John A Tweel, Jr.

(74) *Attorney, Agent, or Firm* — Reches Patents

(57) ABSTRACT

A method for managing an alert generated by a sensor of a security system that is associated with a property, the method comprises: receiving, by a server, a first indication about the alert; searching, by the server and in one or more data structures, for a validator that is associated with a validator address that is within a first predefined area that comprises a location of the property; sending, by the server, to a device of the validator, a validation request for validating the alert; and informing at least one entity out of a police and a central monitoring station about the alert after the validator validated the alert.

16 Claims, 9 Drawing Sheets

700

800

900

1000

SYSTEM AND METHOD FOR DISTRIBUTED SECURITY

CROSS REFERENCE

This application claims priority from U.S. patent application 62/431,829 filing date Dec. 9, 2016—which is incorporated herein by its entirety.

BACKGROUND OF THE INVENTION

Traditional professional alarm systems require trained personnel for installation and deployment of the new systems. The trained personnel is usually responsible for the physical installation of the sensors and devices and also the setup and tuning of the individual sensors and the whole system. This makes the operation of the initial deployment and setup very expensive and time consuming.

There are some vendors that provide low end (such as DIY {Do-It-Yourself}) security systems, where the physical deployment and installation is performed by the end-users. But those systems usually lack support of the Security and Manufacturing standards, such as ES and DC (primarily used for connectivity with Central Monitoring Stations). The physical installation in such systems could be easily broken and circumvented by physical impact (physical damage of the sensors, battery removal etc.) or by powering off the internet routers or cutting the power supply altogether.

Furthermore—the configuration of the low end security sensors is not tailored to the environment of the low-end security sensors and can result in an inefficient and problematic operation of the low-end security system. For example—a low end security sensor can be installed in a location that is blocked by a vase or a chair and thus will not provide adequate coverage.

Traditional professional home security alarm systems usually registers an emergency event and sends a signal to the central monitoring stations (CMS), where the appropriate authorities are notified and sent to the house.

The first signal sent by control panel will alert monitoring personnel at the central station, who will call to notify the user and confirm whether it's a real emergency or a false trigger. If the user doesn't respond, the alarm monitoring service contacts the proper agency to dispatch emergency personnel to user's address. Alternatively, the monitoring personnel can send the security patrol car to check the house, if it has its own patrol car fleet.

This solution is expensive (typically, there is a fee for services rendered by CMS). The response time is relatively high—the security car fleet is not big enough to quickly respond to each call quickly. The security cars and police cars that may attend to an alert could be easily detected by the intruders from big distance.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Social Watch

Figure 1:
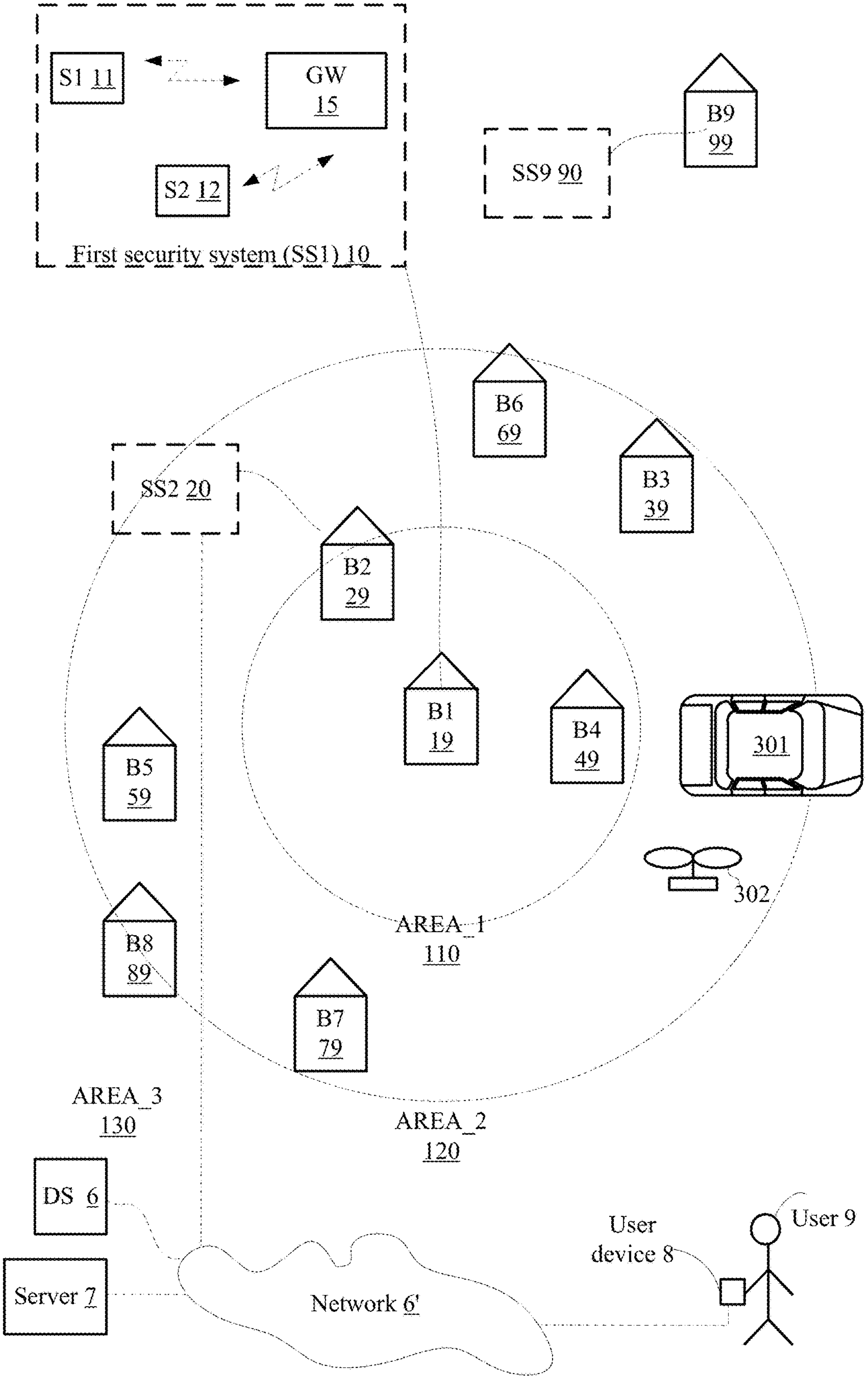
FIG. 1 illustrates buildings, security systems, a server, a network, a user and a user device, according to an embodiment of the invention.

According to an embodiment there may be provided a system, method and computer program product (referred to as social watch) that may harness the power of the modern social networks for improving security.

Instead of using central monitoring stations (CMS), the suggested solution may use the automatic dispatching approach (Automated CMS) to handle the events and alarm produced by the controlling panels and involves the mutually beneficial help between the users of the system.

The system may allow a user (which is a person that may be an owner of a property or otherwise associated with the property) to add an arbitrary amount of persons (such as neighbors, friends, co-workers) as trusted validators that will be notified upon alarm conditions.

The property may be a building, may not be a building, may include the residence of the user, a working place of the user and the like.

Based on the current geolocation of the trusted validators and their ability to validate current alarm, the system will guide the trusted validator to get to the property (for example by providing a navigation maps), will show one or more pictures of the property (or other identifying information of the building) previously taken (for example—taken during a setup of the system) and will provide instructions (such as easy-to-use menus) to a user device (such as in the form of screen shots displayed by a mobile communication device that executes a mobile application) in order to perform the various security enhancing steps.

In case when no trusted validators can be found in a predefined first area (for example—three kilometers from the property), the system may perform a lookup of nearby users of the system. Those users may be regarded as untrusted validators.

It is noted that the system may search in parallel for trusted and untrusted validators.

Alternatively the system may start searching untrusted validators before searching for trusted validators, and the like.

Although the following examples refers to two types of validators (trusted and untrusted) it is noted that there may be more than two types of validator that may be assigned with trust levels out of more than two trust levels.

A validation request will be popped to untrusted users by their mobile application, and in case they can accept this request—the mobile application will provide to any untrusted validator similar guidelines to reach the user's property and perform the visual check of the possible intrusion etc.

The user will be notified by the system if the validation was performed by the trusted or untrusted validators, and according to that will be able to decide if the event should be escalated to the Police.

The number of validators required to validate the event can also be different for the trusted and untrusted validators.

The social watch allows to reduce the costs of the services provided by the traditional Alarm Systems, may significantly reduce the response and validation time of the event and will be hard to detect by the crime elements.

FIG. 1 illustrates nine buildings B1 19, B2 29, B3 39, B4 49, B5 59, B6 69, B7 79, B8 89 and B9 99. The first building B1 19 is monitored by a first security system (SS1) 10 that includes a gateway (GW) 15 and two sensors S1 11 and S2 12. The second building B2 29 is monitored by second security system SS2 20. Other buildings may or may not be monitored by security systems. A gateway is a non-limiting example of a device or system that receives information from one or more sensors and may relay, process, and/or transmit signals to a third party.

The number of sensors per security system may differ than two.

More or less buildings may be monitored by security systems.

The number of buildings may exceed nine.

The areas defined around the first building B1 19 (first area area_1 110, second area area_2 120 and third area area_3 130) may have a circular shape (as shown in FIG. 1) or have any other shapes.

The first area 110 includes B1 19, B2 29 and B4 49. The second area 120 includes B1 19, B2 29, B4 49, B3 39, B5 59, B6 69, B7 79 and B8 89. The third area includes all nine buildings.

All or some of the security systems may be coupled, directly or indirectly and via network 6' to server 7 and to a user device 8 of user 7.

Network 6' may be any kind of network. It may include wired and/or wireless network, may include the Internet, may be coupled to the Internet, may differ from the Internet.

Server 7 is an example of a remote computer that may perform various operations to facilitate the social watch. The server may be replaced by multiple servers or by any combination of computers. The server may be replaced by a laptop computer, a desktop computer, and the like.

Server 7 may access one or more data structures such as DS 6. DS 6 may be stored in the server 7.

The server 7 is an example of a computerized system that may execute any of the methods listed in the specification. It is noted that any of the methods listed in the specification can be executed by another computerized system. For example—by the user device 8. Any of the methods listed in the specification can partially executed by server 7 and may be partially executed by user device 8.

DS 6 may be stored in (or at least be accessed by) user device 8.

In order to use the social watch, the user should perform a few configuration steps:

a. To supply one or more images of the exterior of the property.

b. To supply an address of the property.

c. To add trusted validators.

The first two configurations usually will be performed during initial setup of the system.

The user may be allowed to add the trusted validators to the system. A potential trusted validator should confirm request to become a trusted validator. After the confirmation the trusted validator will be visible on the list of the trusted validators of the user.

When a trusted validator confirms the request—the user and the trusted validator may become the trusted validators of each other. For example, an owner of B2 29 (monitored by SS20) may use user 9 as a trusted validator and vice verse.

A search for a potential trusted validator may executed by a server 7 or user device 6. It is assumed, for simplicity of application that the device of the user is a mobile communication device (such as but not limited to a smartphone) that execute a mobile application. The search may be a name based search.

During the search the details of the user are shown—such as full name and address.

FIG. 1 also illustrates car 301 and a drone 302. A trusted and/or untrusted validator may be in a car, any other vehicle, or may otherwise move from one location to the other. The location of the trusted and/or untrusted validator may be determined in any manner—including, but not limited to, obtaining location information from a mobile phone of the validator, and the like.

The drone 302 has a camera and may be controlled by the validator during a validation process to acquire one or more images of the property and to allow the validator to determine if there is a sign of intrusion or not. The images may be displayed on a mobile phone of the validator or on any other device.

The drone 302 may include a communication module such as but not limited to LTE (GPRS) module, and with camera could be supplied to a validator (trusted or untrusted) or specific customers and could be involved as additional validator during alarm verification.

When a potential trusted validator responds (for example—accepts) the validator request—the user will get notification about this.

The search for a potential trusted validator may involve searching within various databases such as social network databases for persons that are associated with the user (for example—Facebook friends).

The search may include scanning social networks (such as Facebook) automatically, from the friends lists of the external social networks. For example, by integrating with the user's Facebook account, the system can read the names of the user's Facebook friends and to suggest to add them as the trusted validators to user's account.

Friend locator services such as Facebook's "Friends nearby" or Google "Friend locator" can be used to select only friends nearby the property.

Figure 2:
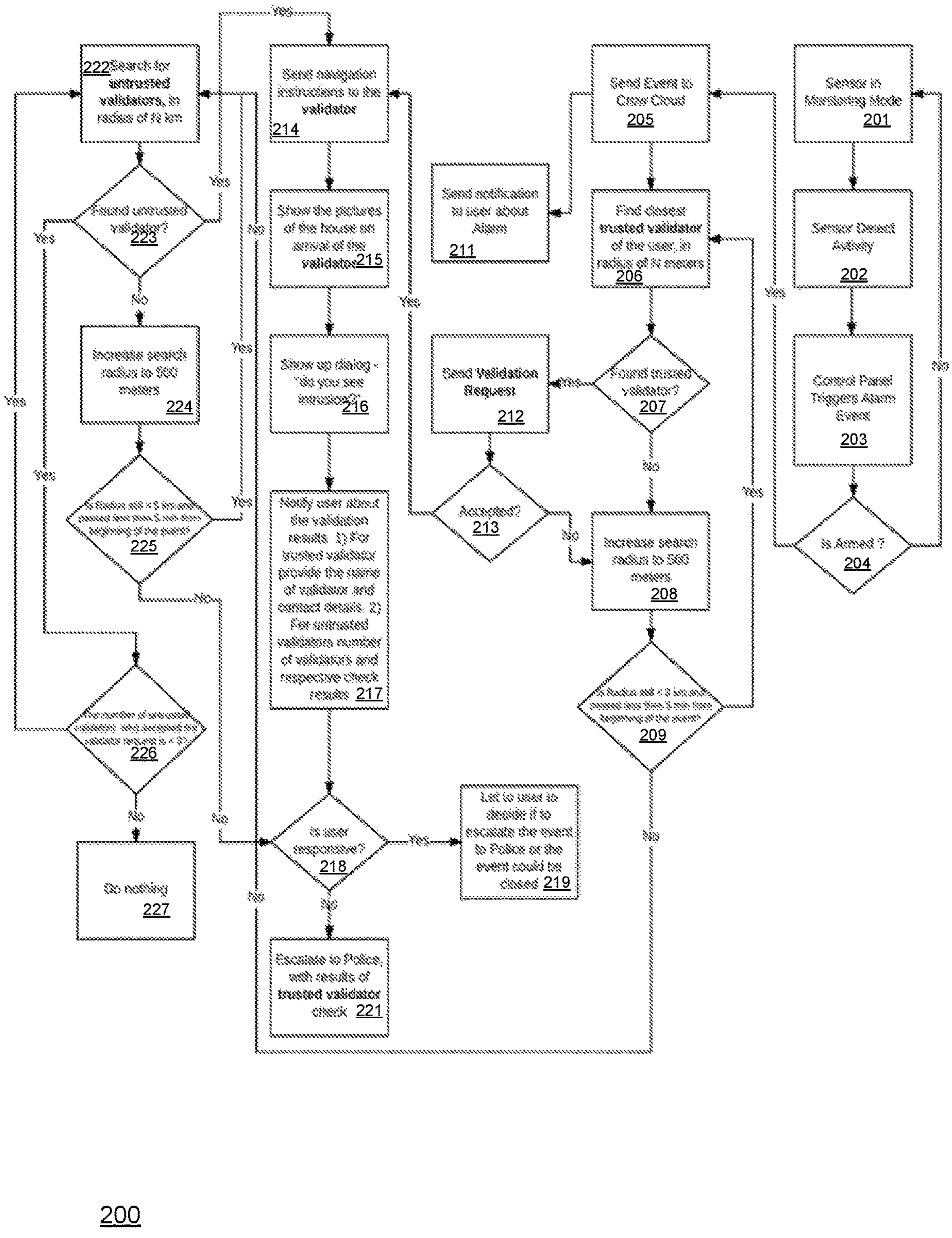
FIG. 2 illustrates a method according to an embodiment of the invention.

FIG. 2 illustrates method 200 for managing an alert generated by a sensor out of S1 11 and S2. The same method may be applied to other security systems of other users.

In the following example it is assumed that the first area (in which trusted validators are searched) has a radius of N meters, that the second area has radius of N+500 meters, that the radius of the areas increases until the radius reaches 3 kilometers and/or that 5 minutes have lapsed from the event, that the maximal radius of the area in which untrusted validators are searched for is five kilometers and that the method searches for at least three untrusted validators that accepted a validation request. These are merely non-limiting examples. For example—the areas may differ from each other by shape, the shape of an area may be non-circular, the change in the size of the areas may differ from steps of 500 meters, and the like.

Method 200 includes steps 201, 202, 203, 204, 205, 206, 207, 208, 209, 211, 212, 213, 214, 215, 216, 217, 218, 219, 221, 222, 223, 224, 225, 226, 226 and 227. The content of these steps is illustrated below:

Sensor in Monitoring Mode (201)—the state describes the normal standby state of the sensor. The transition to the next state will be triggered by some event that sensor can monitoring—e.g. door opening, motion detection etc.

Sensor Activity Detection (202)—the state when the sensor is being triggered by some activity. Sensors passes the information about event to the control panel.

Control Panel should decide (204) if the current state of the system is in Arm mode. If the system is not armed—the initial state "Sensor in Monitoring Mode" is called, otherwise the control panel sends the event (205) to server.

On reception of the Alarm event, the server will perform two simultaneous operations:

a. Will notify the user about alarm event (211).

b. Will start searching (206) the trusted validators that will be closest to the property.

The initial radius (207) of the search is N (for example 300) meters from the property, in case when no trusted validator will be found in this radius will be increased (208) to additional 500 meters, to the current value of the search radius.

For example, the searching radius starting with the initial small searching radius of 300 meters (area 1 110), then it expanded to the additional 500 meters (area_2 120), then it expanded again by additional 500 meters (area_3 130) and finally a fourth area (not shown)—covering a radius of 1800 from B 1 19 the search stops—assuming that a trusted validator was found.

If the searching radius is less than three kilometers, and since beginning of the event passed less than five minutes—continue the search (step 209 is followed by step 206).

In case when trusted validator found in the searching radius, the verification request will be sent to him (212). The trusted validator can (query step 213) confirm or deny the verification request—in case of denial the method will continue (208) search for the closest trusted validators.

If no trusted validators were found (following step 209) then searching (222) for untrusted validators within radius of N meters from B1 19, if not found increasing the radius by 500 meters (224), and repeating until finding an untrusted validator within a radius of 5 kilometers and while five minutes from the event were not lapsed (225). When there are less than three untrusted validators (226) then do nothing.

If the validator (both trusted and untrusted) accepts the verification request (214), he will be prompted with the guidelines how to navigate to the property.

On the arrival, the validator will be prompted (215) with the pictures of the house, which will allow to him easily locate the entrance, and to visually validate the state of the property.

Figure 3:
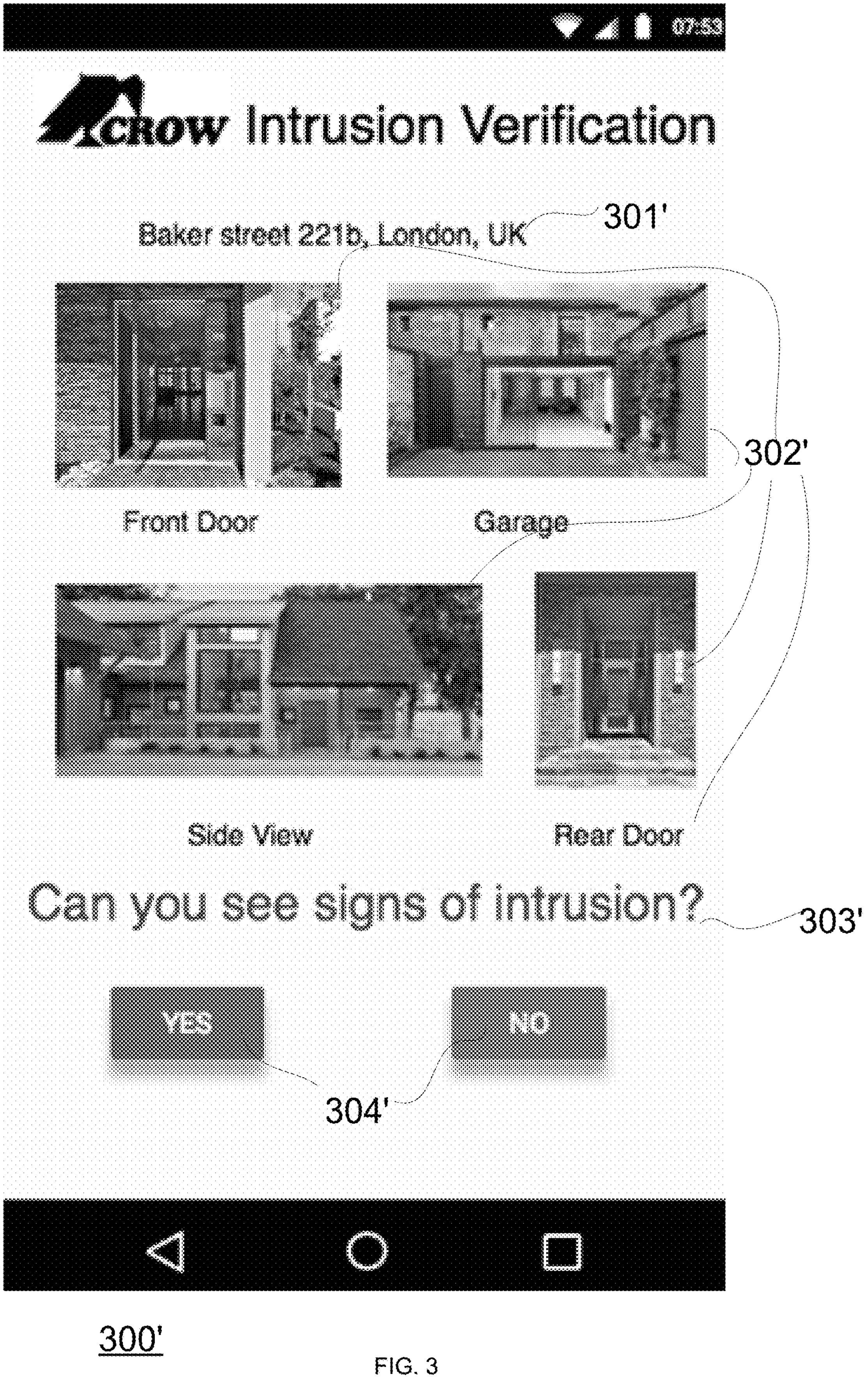
FIG. 3 illustrates a screen shot according to an embodiment of the invention.

The validator may answer any question. He may, for example may be requested to answer only one question (216)—if there are visible signs for intrusion or not. FIG. 3 illustrates an example of a screen shot 300' that displays an address of the property located at address 301', images of the exterior of the building and text about the exterior 302', question to be answered by the validator 303' and response icons 304'.

The user is informed about the validation results (217) and may respond (query step 218). If the user does not respond—let user to decide whether the event should be closed or shall the police be notified (219) and if so—sending a notification to the police. If the user does not respond (221)—notifying the police.

Figure 4:
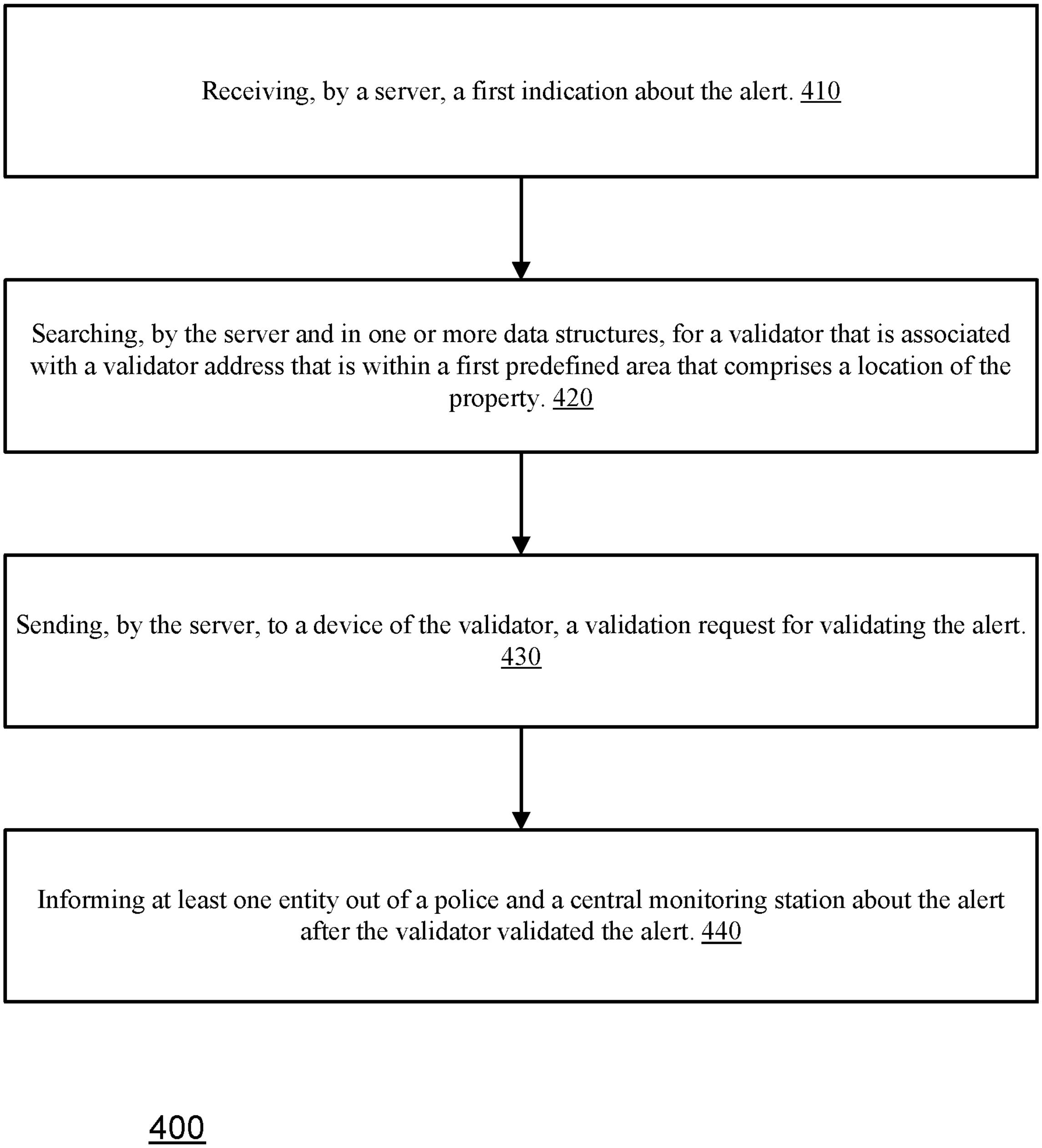
FIG. 4 illustrates a method according to an embodiment of the invention.

FIG. 4 illustrates method 400 according to an embodiment of the invention.

Method 400 is for managing an alert generated by a sensor of a security system that is associated with a property.

Method 400 may be executed by a computerized system such as a server, a user device, and the like. Method 400 may include a sequence of steps 410, 420, 430 and 440.

Step 410 may include receiving, by a server, a first indication about the alert.

Step 420 may include searching, by the server and in one or more data structures, for a validator that is associated with a validator address that is within a first predefined area that comprises a location of the property.

The one or more data structures may be compiled by the computerized system and may include a trusted validators data structure and an untrusted validators data structure.

The one or more data structures may include information relating to trusted validators and to untrusted validators. The method may include registering trusted validators.

The registering of the trusted validators may include receiving contact information of the trusted validator from the person that is associated with the property.

Step 420 may include searching for untrusted validators from users of the security service provided by the computerized system.

Step 420 may include searching for an untrusted validator with a validator address that is within the first predefined area only after failing to find any trusted validator with a validator address that is within the first predefined area.

Step 420 may include searching for a validator with a validator address that is outside the first predefined area but inside a second predefined area that exceeds the first predefined area and comprises the location of the property only after failing to find any trusted validator with a validator address that is within the first predefined area.

Step 430 may include sending, by the server, to a device of the validator, a validation request for validating the alert.

Step 440 may include informing at least one entity out of a police and a central monitoring station about the alert after the validator validated the alert.

Step 440 may include informing the at least one entity about the alert only when a predefined number of validators validated the alert.

Step 440 may include sending to the validator directions about a path from the validator address to the property.

Professional Installation

According to an embodiment there may be provided a system, method and computer program product that may assist in configuring a security system. This may allow users to install the security system and configure the security system at a professional level without using professional installers.

The method may involve assisting a user to install one or more sensors and configure the one or more sensors. The assistance may involve acquiring information, determining how and where to install the sensor, instructing the user where to install the sensor, and triggering one or more tests of the sensor.

The assistance may include displaying to the user easy setup assistant user interfaces (software wizards) that present to end user the sequences of dialog boxes that lead the user through a series of well-defined steps of installation and tuning of the system.

A typical installation flow may include the steps that are listed below. In the following example the building is the house of the user.

Initial Steps:

Install an application (Android/Ios) application from the respective marketplace.

The application will ask general configuration data such as:

a. The address of the house (street name, town etc.)—the suggestions will be provided, since the mobile application will take the exact geo location of the house.
b. Name of the user (or users).
c. Number of persons leaving in this house.
d. Email/phone of the user—used for notification The mobile application will popup dialog for taking the pictures of the house from outside. This may be used by the social watch (see FIGS. 1-4) to verify the possible intrusion.

Sensor Installation

Using the application embedded barcode scanner read the barcode printed on the sensor.

Figure 5:
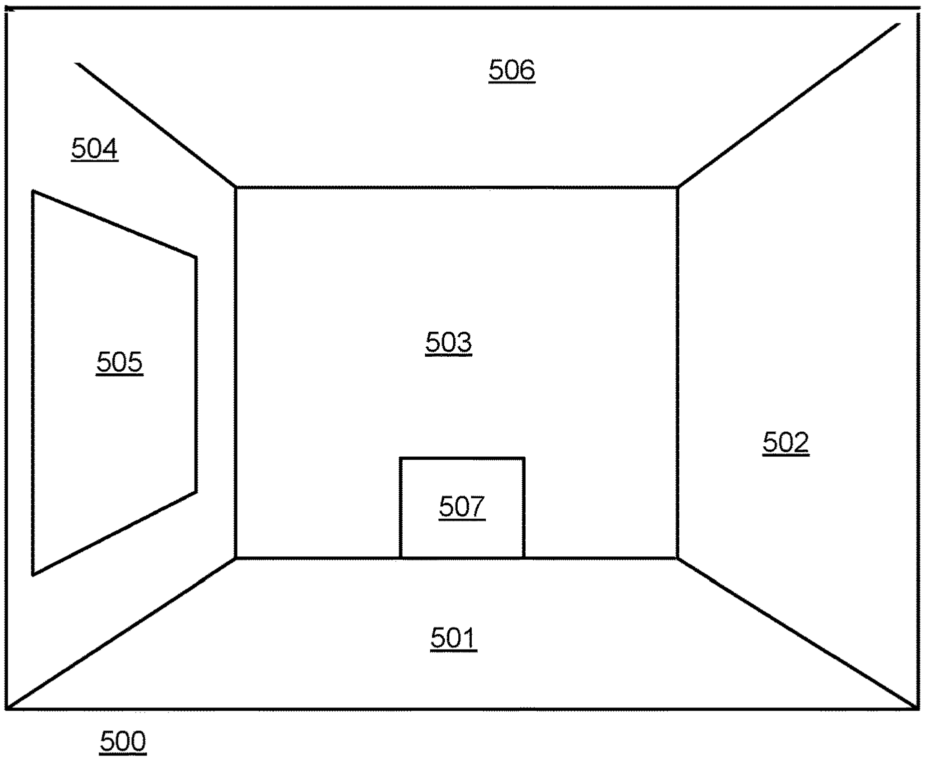
FIG. 5 illustrates an image of a space.
Figure 6:
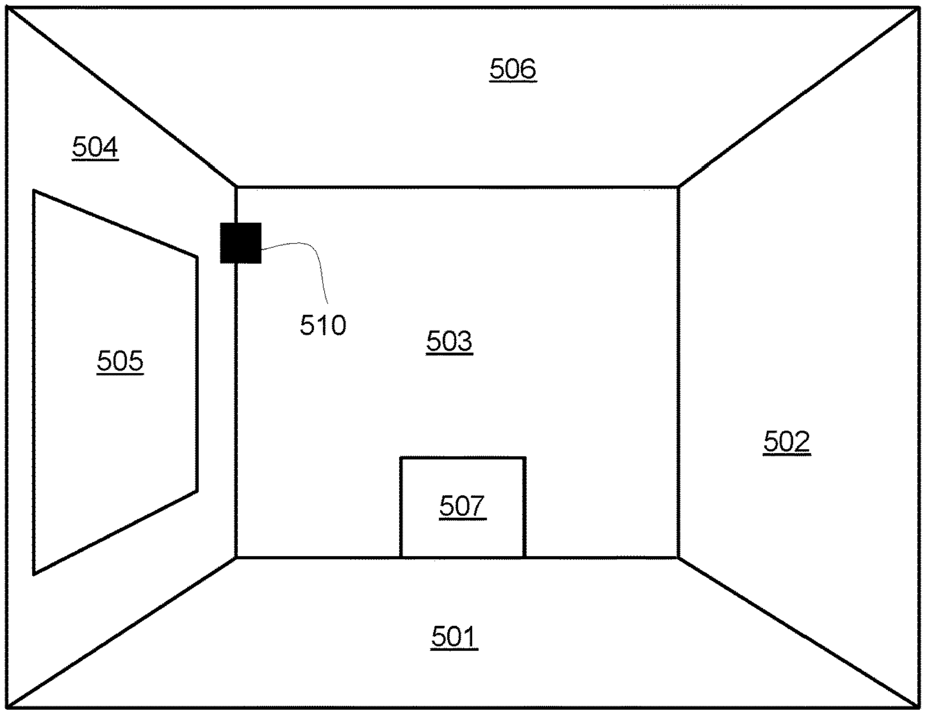
FIG. 6 illustrates an image of a space and a suggested location of a sensor.

The application will automatically determine the sensor type and will show the instruction for physical deployment of device in the mobile application. For example:

a. For Door Sensor—the mobile application will ask a user about the door construction (wood, plastic, metal), direction of the door opening (inside, outside, slide), the height of the door—and will provide detailed instruction on where and how to assemble the Door Sensor, according to the user answers.
b. Motion Detector—the mobile application will ask a user about the room geometry (rectangular, square), the size of the room, the location of the entrance door, windows etc. and the suggestion on the correct placement and installation instruction for the Motion Detector will be provided, according to the user's input. (additional approach will be by image processing of the room, where the user can take the panoramic picture of the room, or to take sequence of the pictures of the room, and mobile application will automatically analyze and suggest the best place for the Motion Detector placement). For example, if user takes picture of the room (FIG. 5), the mobile application will be able to suggest the placement of the motion detector—see the square in FIG. 6. The room 500 of FIG. 5 includes a ceiling 506, floor 501, three walls 502, 503 and 504, an opening 505 formed in wall 504, and a fireplace 507. The method suggests to install a sensor at location 510—above the fireplace and at the corner formed by walls 503 and 504.

The signal strength verification—after the installation the mobile application will warn if the signal strength between the device and the Gateway is not strong enough and will suggest to move the device in case the signal strength is low.

The mobile application will ask to perform a triggering action, to validate that the device was properly installed. For example:

a. For door sensor —user will be asked to open/close the door to validate proper physical installation.
b. For motion detector—user will be asked to exit/enter the room.

After the physical placement of the sensor the following tuning dialogs may appear. These dialogs will tune the sensitivity of the sensor (the following dialog is for the Motion Detector sensors):

a. Do you have small kids—ages, do they still crawl?
b. Which kind of pets do you have—cat, dog, llama . . .
    c. Choose from the pictures provided by mobile application the similar kind of the pet (size, fur lengths etc.). Instead of the pictures the dialog with predefined possible answers may appear.
d. Provide logical name of the room/space.
e. Confirm setup.

For example—when configuring a motion detector —when user specifies that there are pets at home, the number of pulses needed to detect the movement could be increased. E.g. if the default pulse count is 1, when user specifies that the dog is big (more than 15 kg) the pulse count parameter could remain the same, when user specifies the size of the dog is medium (5-15kg) the pulse count will be switched to 2, the small dog will require 3 pulse counts. All numbers are provided only for example, and could be changed later (the default could be 2 pulse counts and accordingly the pet weights could be reflected with different pulse count numbers).

For example—when configuring a motion detector—the pulse thresholds (the markers when the pulse is beginning) is also a configurable option. The thresholds (or signal gain in Crow internal terminology) are used to configure the sensor to count the pulses properly in different environments. The following factors could influence the thresholds—the room size (bigger room will require smaller thresholds or signal gain), the level of noise in the room (usually opened window in room, leaving room etc.)—the noisy room will require to increase the threshold, pets—size, fur size—furry pet of the same size will emit less energy—so accordingly the thresholds will be set to bigger or smaller values.

For example—when configuring a motion detector—direction of movement. It is possible to detect movement direction with PIR Detectors, the configuration may specify some kid protective flows—for example alerting movement of the kid/pet to window or swim pool.

For example—when configuring a glass break detector—the detector that has different characteristic to monitor, such as window fall, vibration level (gross attack detector) etc. In case when user specifies the existence of pets at home, according to the size and weight of pet the default level of the vibration sensitivity could be decreased. Same when the user specifies that there are small kids.

After completion of the Sensor setup dialogs, the next Sensor will be installed and configured.

Figure 7:
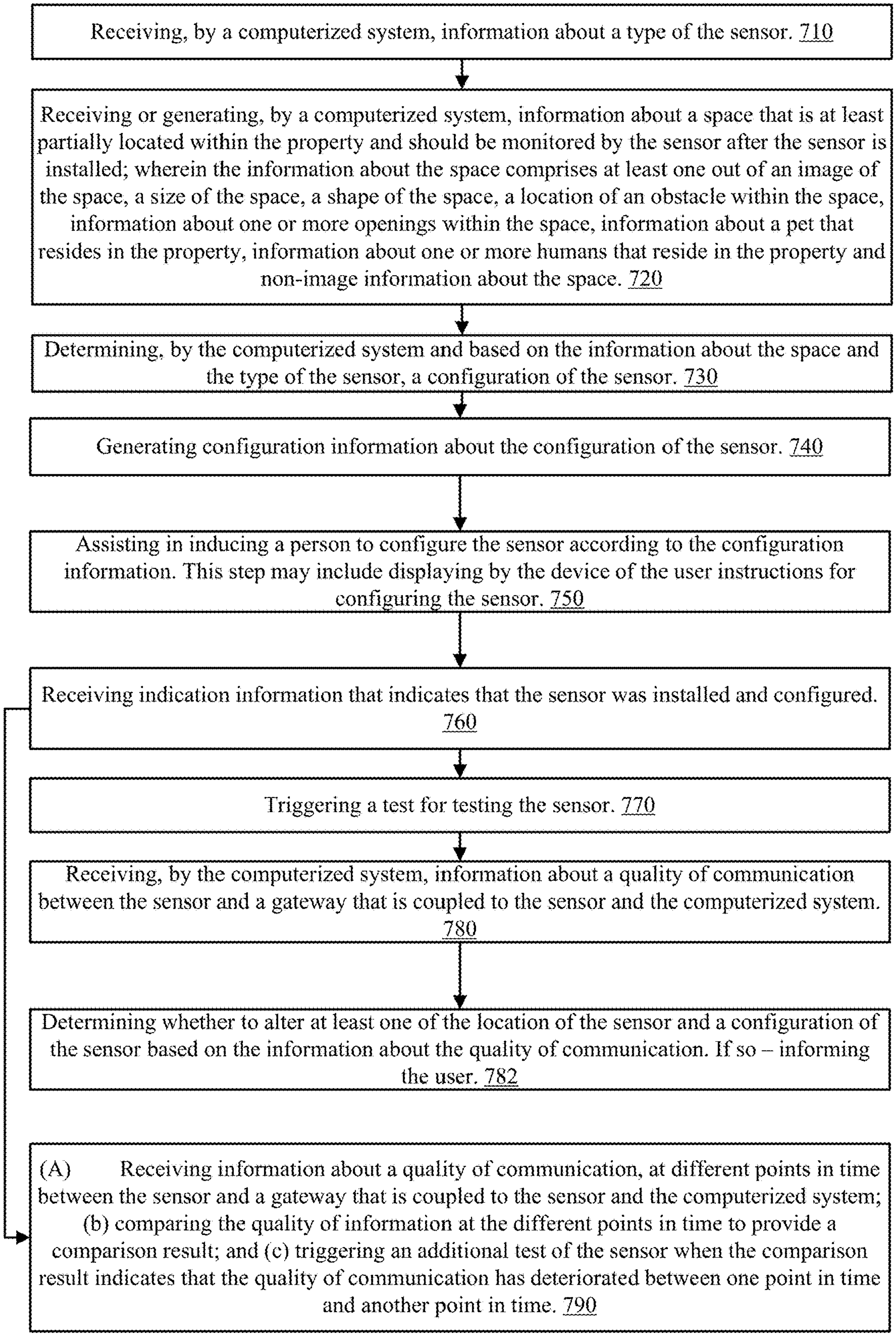
FIG. 7 illustrates a method according to an embodiment of the invention.

FIG. 7 illustrates method 700 for configuring a sensor of a security system that is associated with a property.

Method 700 may include a sequence of steps 710, 720, 730, 740, 750, 760, 770 and 782. Method 700 may also include step 790.

Step 710 may include receiving, by a computerized system, information about a type of the sensor.

Step 720 may include receiving or generating, by a computerized system, information about a space that is at least partially located within the property and should be monitored by the sensor after the sensor is installed; wherein the information about the space comprises at least one out of an image of the space, a size of the space, a shape of the space, a location of an obstacle within the space, information about one or more openings within the space, information about a pet that resides in the property, information about one or more humans that reside in the property and non-image information about the space.

Step 730 may include determining, by the computerized system and based on the information about the space and the type of the sensor, a configuration of the sensor.

Step 720 may include receiving or generating information about the space that are one or more images of the space that are acquired by the computerized system. Step 730 may include image processing the one or more images to determine the shape of the space, the size of the space, and the location of one or more openings within the space.

Step 740 may include generating configuration information about the configuration of the sensor.

Step 750 may include assisting in inducing a person to configure the sensor according to the configuration information. This step may include displaying by the device of the user instructions for configuring the sensor.

Step 760 may include receiving indication information that indicates that the sensor was installed and configured.

Step 770 may include triggering a test for testing the sensor.

Step 780 may include receiving, by the computerized system, information about a quality of communication between the sensor and a gateway that is coupled to the sensor and the computerized system. Step 780 may follow step 770 (as illustrated in FIG. 7) or may preceded step 780.

Step 782 may include determining whether to alter at least one of the location of the sensor and a configuration of the sensor based on the information about the quality of communication. If so—informing the user.

Step 770 may include triggering multiple tests for testing the sensor after the reception of the indication information.

The triggering of the multiple tests may be executed in a periodical manner

The triggering of at least one test of the multiple tests based on a detection of a change in a transmission parameter of the sensor.

The triggering of at least one test of the multiple tests may be based on a detection of a change in a content of the space.

Method 700 may include step 790 of (a) receiving information about a quality of communication, at different points in time between the sensor and a gateway that is coupled to the sensor and the computerized system; (b) comparing the quality of information at the different points in time to provide a comparison result; and (c) triggering an additional test of the sensor when the comparison result indicates that the quality of communication has deteriorated between one point in time and another point in time.

Automatic Troubleshooting

One of the major problems in the current Home Security solutions is the post-installation troubleshooting:

a. What if the sensor was properly installed and configured, but then the furniture was added or moved and the signal from the sensor became too weak? The sensor would probably stop being fully functional.
b. What if a single sensor became inactive for a long time but the rest of the sensors still work as usual?

The system will learn and keep track of the signal strength (RSSI—Received Strength Signal Indicator) for each sensor. When an anomaly in the signal strength is detected, the system will determine whether the anomaly is temporal and if it is not, will notify the user proactively (with notifications) about the problem.

For example—RSSI—can be measured in decibels from 0 (zero) to −120 (minus 120). The closer this value to 0 (zero), stronger the signal. Typically for proper work of the sensors needed −80 dBm or better values of RSSI.

The system will keep track of the sensors activity and notify a user about possible problems such as appearance of objects that obstacle the camera view, broken door lockers, etc.

RSSI Troubleshooting

The Gateway will periodically send the RSSI metrics for each device/sensor to the server.

The historical data, and average RSSI level of the sensors will be stored in the Big Data storage.

The scheduled jobs will be performed on the server side to discover deviating RSSI metrics.

The following verifications will be performed to determine the source of the problems:

a. Battery level of the device (sent by the gateway, and collected as well into the Big Data)—will predict a possible received signal strength loss due to the low battery power.
b. Verification of the temporal loss of signal—in case some object in the room obstacles a sensor for less than 5 hours constantly—those metrics should be ignored.

Aggregation of the collected data is performed on the daily basis. These aggregated average values are used to promptly detect possible RSSI deviations.

In case of a signal strength decrease, the system will notify appropriate user(s) with a message, according to the sensor information.

The message contains the device name and a possible cause of the problem (battery level, obstacles, etc.)

Camera Troubleshooting

The server based scheduled job will periodically send requests to the cameras to take pictures of the room.

The latest images will be analyzed to calculate differences between the latest image and previously stored images. The image processing will be involved to clear out the moving objects such as people and pets.

Should a new static object be detected by a camera, automatic analysis of the camera activity detection will be performed to determine whether new object is a possible obstacle.

In case of the obstacle suspicion, a user will be notified about a possible problem with the specific camera. (The server will send such notification message with explanation about the problem, with the copy of two images—the room in the past, when the camera was active and the room in present).

Door/Window Sensors

The Gateway sends information about the status change of the door/window sensors to the server.

The server stores the metrics about the door/window statuses in the Big Data storage.

The server performs scheduled jobs for finding deviating behavior, when the door or window sensors for some reason don't change state for a long time.

The server will send notification to the user with description of the problem and details about the sensor.

Figure 8:
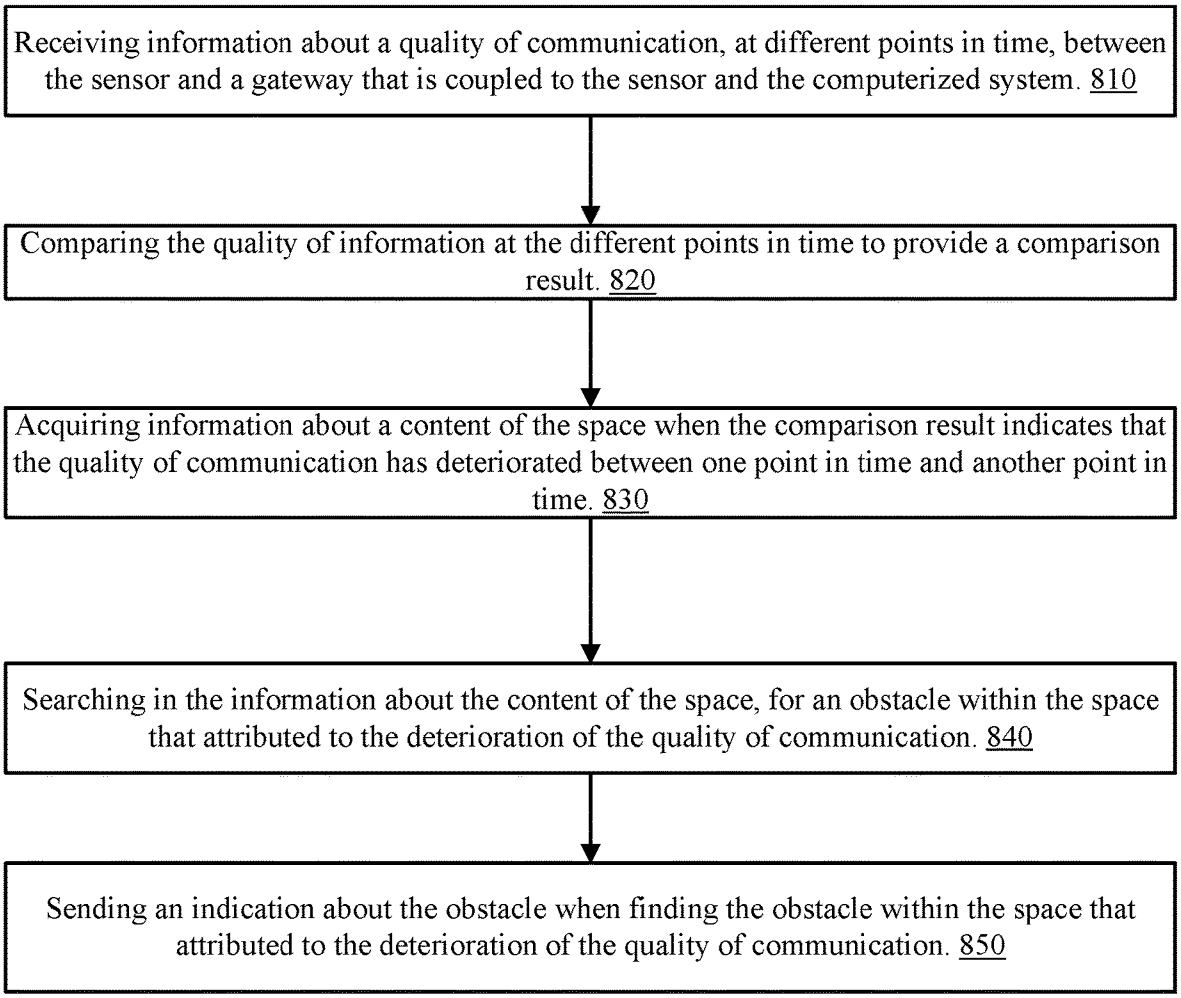
FIG. 8 illustrates a method according to an embodiment of the invention.

FIG. 8 illustrates method 800 according to an embodiment of the invention.

Method 800 may include steps 810, 820 and 830.

Step 810 may include receiving information about a quality of communication, at different points in time, between the sensor and a gateway that is coupled to the sensor and the computerized system.

The different points in time may be spaced apart from each other by few (1,2,3,4 or more) hours.

The information about the content of the space comprises images of the space.

Step 820 may include comparing the quality of information at the different points in time to provide a comparison result.

Step 830 may include acquiring information about a content of the space when the comparison result indicates that the quality of communication has deteriorated between one point in time and another point in time.

Step 840 may include searching in the information about the content of the space, for an obstacle within the space that attributed to the deterioration of the quality of communication.

Step 850 may include sending an indication about the obstacle when finding the obstacle within the space that attributed to the deterioration of the quality of communication.

Figure 9:
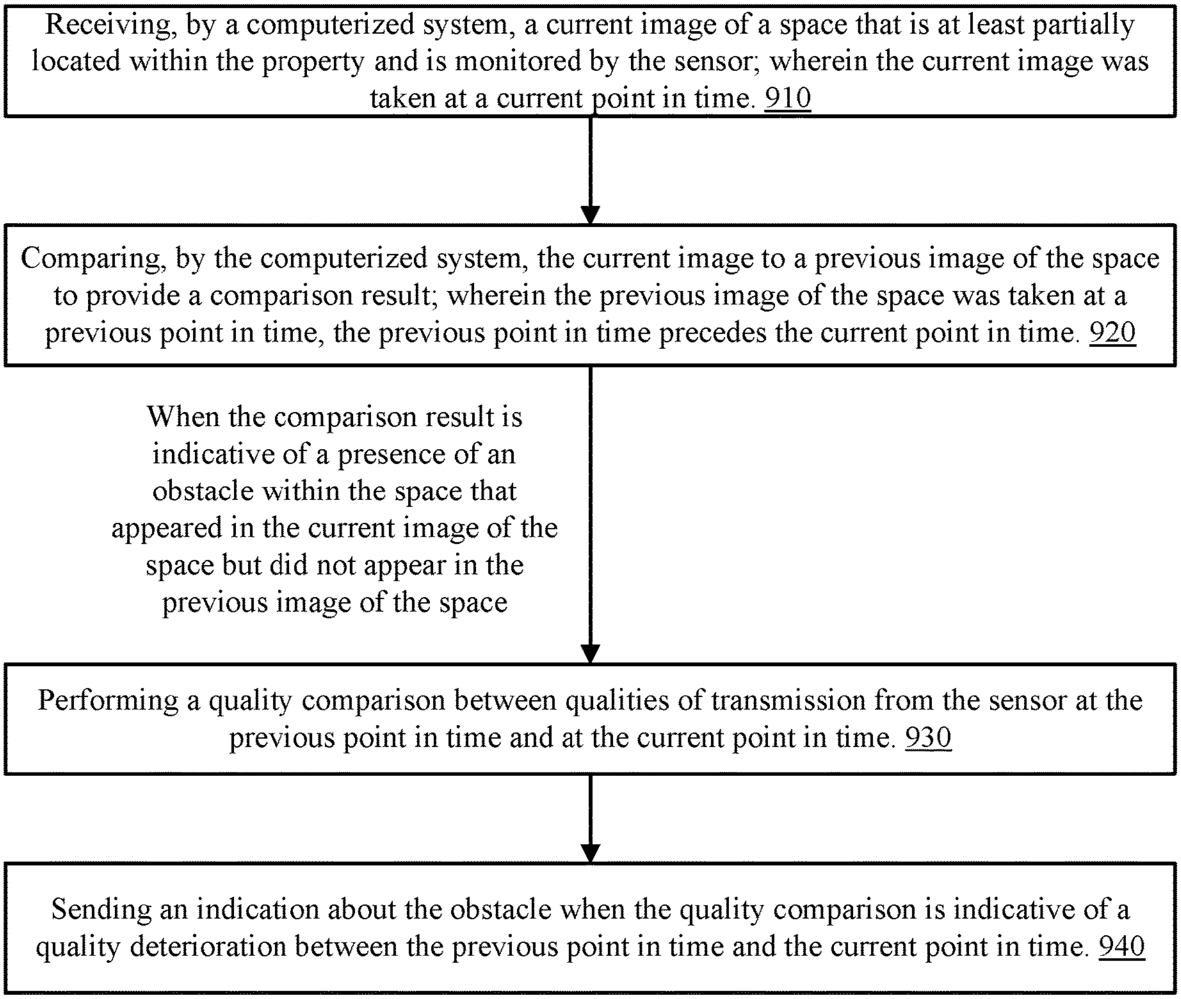
FIG. 9 illustrates a method according to an embodiment of the invention.

FIG. 9 illustrates method 900 according to an embodiment of the invention.

Method 900 is a method for monitoring a sensor a sensor of a security system that is associated with a property.

Method 900 may include steps 910.

Step 910 may include receiving, by a computerized system, a current image of a space that is at least partially located within the property and is monitored by the sensor; wherein the current image was taken at a current point in time.

Step 920 may include comparing, by the computerized system, the current image to a previous image of the space to provide a comparison result; wherein the previous image of the space was taken at a previous point in time, the previous point in time precedes the current point in time.

When the comparison result is indicative of a presence of an obstacle within the space that appeared in the current image of the space but did not appear in the previous image of the space then step 920 may be followed by step 930.

Step 930 may include performing a quality comparison between qualities of transmission from the sensor at the previous point in time and at the current point in time.

Step 940 may include sending an indication about the obstacle when the quality comparison is indicative of a quality deterioration between the previous point in time and the current point in time.

The quality comparison of step 930 may include comparing between qualities of communication, at the previous and current points in time, between the sensor and a gateway that is coupled to the sensor and the computerized system.

Activity Simulation (Home Automation).

Most of the intrusions to the private houses occur when the residents are not at home. The intruders observe the house and check the presence of the regular "life indicators" such as lights, TV, sounds etc. in order to decide if the house is empty or not.

There are some Home Security vendors providing solutions based on remote or scheduled activation of the devices which may mimic some "life activities" at home.

Based on the metrics sent and collected periodically by the Sensors and transmitted to Gateway, the server based learning system will "learn" the "standard" behavior of the home devices. The home residents will be able to schedule the "auto-playing" of the house devices to the absence period.

Implementation Details

The Output devices such as DECT electric outlets periodically send information about power and energy usage for specific device. Usually those devices will be given logical names during the installation/setup stage.

The collected metrics will be transmitted and stored in server and later will be analyzed to build the average hourly consumption report. Based on this report (stored in the Big Data based structures)—server will determine the usual on/off status of specific output devices.

When a user wants to turn on the Activity Simulation, she will access the mobile application and choose Activity Simulation menu.

The list of all Output devices configured in a user's home will be shown (by default all will be turned on), and user can remove some devices from the list.

The user may also turn on the "randomize" option, when selected output device will be randomly turn on/off for a random period in time.

The user will configure the dates of the absence period.

The system will simulate house activities based on the "learned" house behavior and user inputs.

Peripheral Device Configuration Profiles

Some of devices could be involved in the Home Automation scenarios. For example, when Motion Detector detects that someone entering or leaving the room, the lights could be turned on/off automatically. Typically, those devices will be configured to low sensitivity mode or/and other configuration settings which may be different depending on the Home Automation scenario. Those Home Automation settings could affect the quality of the Alarm System.

The system will keep track on several configuration modes for each device. The system will switch between the configurations automatically depending on the scenario (Home Automation Profiles, and Alarms).

Implementation Details

During the initial setup of the system, the Alarm configuration of a device will be stored in a server. When a user will add device to one of the Home Automation Profiles—the additional configuration will be stored on the server.

Separate configuration will be used when switching between Home Automation Profiles and Alarm/Security.

Figure 10:
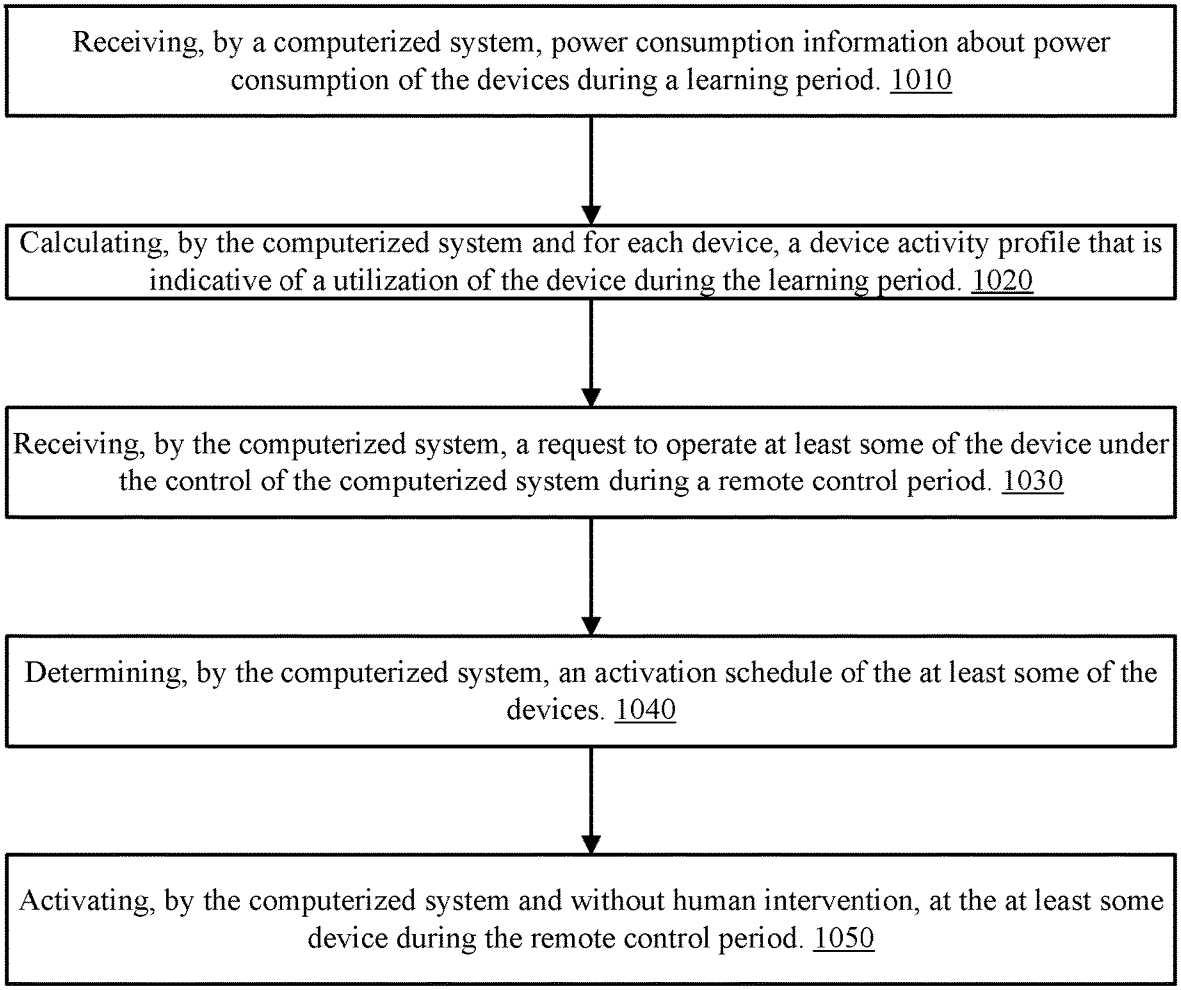
FIG. 10 illustrates a method according to an embodiment of the invention.

FIG. 10 illustrates method 1000.

Method 1000 is for monitoring and operating devices that are installed in a property.

Step 1010 may include receiving, by a computerized system, power consumption information about power consumption of the devices during a learning period.

Step 1020 may include calculating, by the computerized system and for each device, a device activity profile that is indicative of a utilization of the device during the learning period.

Step 1030 may include receiving, by the computerized system, a request to operate at least some of the device under the control of the computerized system during a remote control period.

Step 1040 may include determining, by the computerized system, an activation schedule of the at least some of the devices.

Step 1050 may include activating, by the computerized system and without human intervention, at the at least some device during the remote control period.

Step 1040 may be based on the device activity profile of each device of the at least some of the devices.

Step 1040 may be made in a random manner.

In the foregoing specification, the invention has been described with reference to specific examples of embodiments of the invention. It will, however, be evident that various modifications and changes may be made therein without departing from the broader spirit and scope of the invention as set forth in the appended claims.

Any reference to the term "comprising" should be applied mutatis mutandis to the term "consisting of" or to the term "consisting essentially of".

Any combination of any steps of methods 400, 700, 800, 900 and 1000 may be provided.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated, and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for managing an alert generated by a sensor of a security system that is associated with a property, the method comprises:
 receiving, by a server, a first indication about the alert;
 searching, by the server and in one or more data structures, for a validator that is associated with a validator address that is within a first predefined area that comprises a location of the property; wherein the one or more data structures comprise information relating to trusted validators and to untrusted validators; wherein the method comprises registering trusted validators;
 sending, by the server, to a device of the validator, a validation request for validating the alert; and
 informing at least one entity out of a police and a central monitoring station about the alert after the validator validated the alert.

2. The method according to claim 1 wherein the registering of the trusted validators comprises receiving contact information of the trusted validator from the person that is associated with the property.

3. The method according to claim 1 comprising registering a person that is associated with the property to a security service; and wherein the searching comprises searching for untrusted validators from users of the security service.

4. The method according to claim 3, wherein the one or more data structures comprises a trusted validators data structure and an untrusted validators data structure.

5. A method for managing an alert generated by a sensor of a security system that is associated with a property, the method comprises:
 receiving, by a server, a first indication about the alert;
 searching, by the server and in one or more data structures, for a validator that is associated with a validator address that is within a first predefined area that comprises a location of the property;
 sending, by the server, to a device of the validator, a validation request for validating the alert; and
 informing at least one entity out of a police and a central monitoring station about the alert after the validator validated the alert;
 wherein the one or more data structures store information about trusted validators and untrusted validators; wherein the method comprises searching for an untrusted validator with a validator address that is within the first predefined area only after failing to find any trusted validator with a validator address that is within the first predefined area.

6. A method for managing an alert generated by a sensor of a security system that is associated with a property, the method comprises:
 receiving, by a server, a first indication about the alert;
 searching, by the server and in one or more data structures, for a validator that is associated with a validator address that is within a first predefined area that comprises a location of the property;
 sending, by the server, to a device of the validator, a validation request for validating the alert; and
 informing at least one entity out of a police and a central monitoring station about the alert after the validator validated the alert;
 wherein the one or more data structures store information about trusted validators and untrusted validators;
 wherein the method comprises searching for a validator with a validator address that is outside the first predefined area but inside a second predefined area that exceeds the first predefined area and comprises the location of the property only after failing to find any trusted validator with a validator address that is within the first predefined area.

7. The method according to claim 1 comprising informing the at least one entity about the alert only when a predefined number of validators validated the alert.

8. The method according to claim 1 comprising sending to the validator directions about a path from the validator address to the property.

9. A computer program product that is non-transitory and stores instructions that once executed by a server causes the server to manage an alert generated by a sensor of a security system that is associated with a property, by:
 receiving a first indication about the alert;
 searching in one or more data structures, for a validator that is associated with a validator address that is within a first predefined area that comprises a location of the property; wherein the one or more data structures comprise information relating to trusted validators and to untrusted validators; wherein the computer program product further stores instructions for registering trusted validators;
 sending to a device of the validator, a validation request for validating the alert; and
 informing at least one entity out of a police and a central monitoring station about the alert after the validator validated the alert.

10. The computer program product according to claim 9 wherein the registering of the trusted validators comprises receiving contact information of the trusted validator from the person that is associated with the property.

11. The computer program product according to claim 9 that further stores instructions for registering a person that is associated with the property to a security service; and
 wherein the searching comprises searching for untrusted validators from users of the security service.

12. The computer program product according to claim 9, wherein the one or more data structures comprises a trusted validators data structure and an untrusted validators data structure.

13. The computer program product according to claim 9, that further stores instructions for searching for an untrusted validator with a validator address that is within the first predefined area only after failing to find any trusted validator with a validator address that is within the first predefined area.

14. The computer program product according to claim 9, that further stores instructions for searching for a validator with a validator address that is outside the first predefined area but inside a second predefined area that exceeds the first predefined area and comprises the location of the property only after failing to find any trusted validator with a validator address that is within the first predefined area.

15. The computer program product according to claim 9, that further stores instructions for informing the at least one entity about the alert only when a predefined number of validators validated the alert.

16. The computer program product according to claim 9, that further stores instructions for sending to the validator directions about a path from the validator address to the property.

* * * * *